United States Patent [19]
Henes

[11] 3,807,426
[45] Apr. 30, 1974

[54] PRESSURE OPERATED VALVE

[76] Inventor: Richard W. Henes, 4301 E. Madison St., Phoenix, Ariz. 85034

[22] Filed: June 25, 1973

[21] Appl. No.: 372,970

[52] U.S. Cl.................. 137/100, 137/118, 251/331
[51] Int. Cl.......................... G05d 11/02, F16k 7/17
[58] Field of Search.................. 137/111, 118, 100; 251/331

[56] References Cited
UNITED STATES PATENTS

| | | | |
|---|---|---|---|
| 3,635,601 | 1/1972 | Larson et al.............. | 137/100 |
| 3,727,627 | 4/1973 | Bird et al................. | 137/100 |
| 2,930,391 | 3/1960 | Bass et al................. | 137/118 |
| 2,992,652 | 7/1961 | Fellberg.................... | 137/118 |
| 3,729,014 | 4/1973 | Narumi..................... | 137/118 X |
| 3,105,507 | 10/1963 | Dunmir..................... | 251/331 X |
| 3,707,982 | 1/1973 | Hogel........................ | 137/119 |

*Primary Examiner*—William R. Cline
*Attorney, Agent, or Firm*—Warren F. B. Lindsley

[57] ABSTRACT

A pressure operated valve having an axially expandable circular diaphragm for closing one or another of two fluid passageways on opposite sides of the diaphragm depending on the pressure differential on opposite sides of the diaphragm.

3 Claims, 4 Drawing Figures

PATENTED APR 30 1974 3,807,426
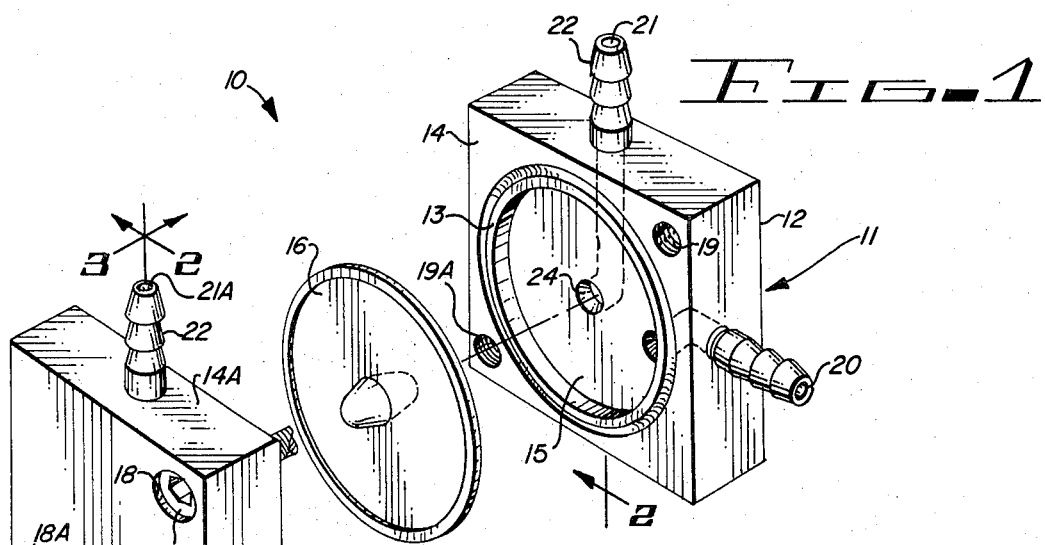
FIG-1
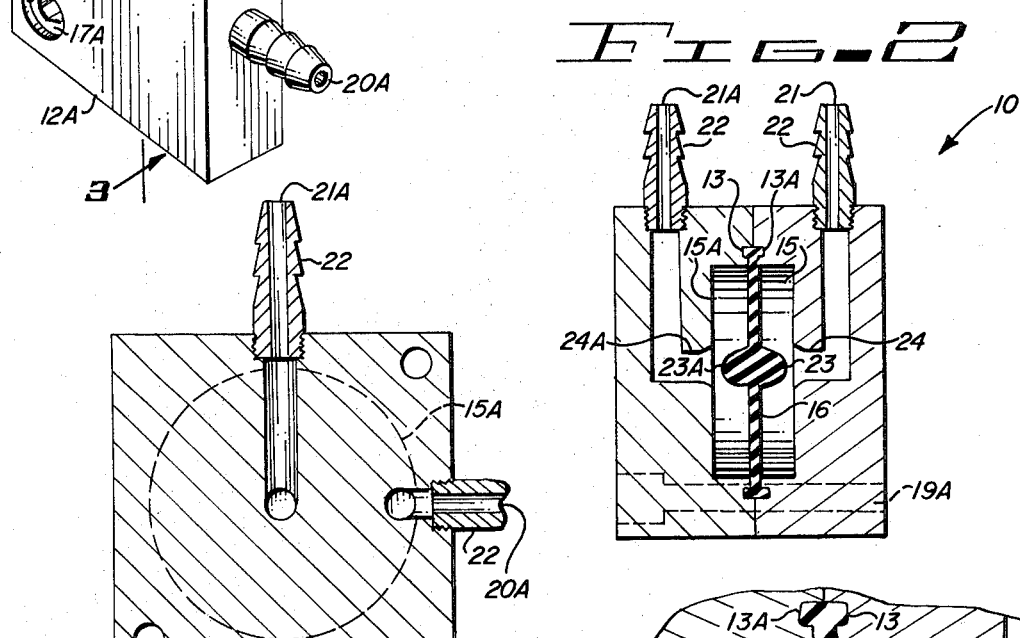
FIG-2
FIG-3
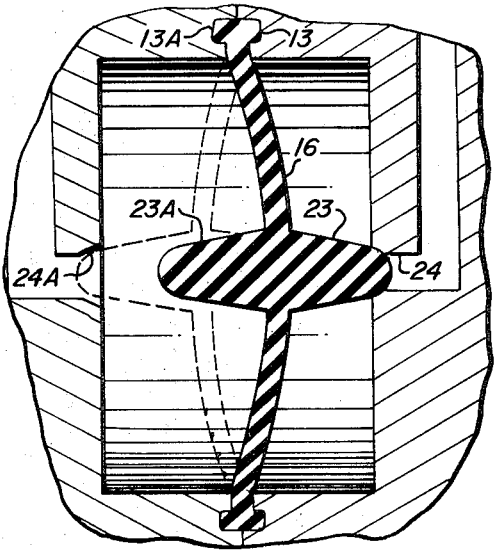
FIG-4

3,807,426

PRESSURE OPERATED VALVE

BACKGROUND OF THE INVENTION

This invention relates to a pressure operated valve and more particularly to a diaphragm operated valve for opening and closing valve ports on opposite sides of the diaphragm depending on a predetermined pressure differential in the valve.

Heretofore, pressure operated diaphragm valves have been difficult to manufacture at reasonable costs and have failed to provide accurate and sensitive control of more than one valve port.

SUMMARY OF THE INVENTION

This invention is particularly directed to a valve for controlling two streams of fluid flows wherein the housing of the valve is divided into two isolated portions by a diaphragm. Each portion has an outlet port which is controllable by the diaphragm upon the existance of a predetermined pressure differential between the two portions of the housing.

It is, therefore, one object of this invention to provide a new and improved diaphragm controlled valve.

Another object of this invention is to provide an improved pressure operated diaphragm valve which utilizes movement of a diaphragm along its longitudinal axis to control two valve ports.

A further object of this invention is to provide an improved pressure operated diaphragm controlled valve wherein the diaphragm is so constructed as to divide a valve housing into fluid isolated portions and to control fluid movement through said portions in accordance with fluid pressure conditions in said portions.

A still further object of this invention is to provide an improved fluid pressure operated valve wherein protrusions on opposite faces of a diaphragm dividing a valve housing into two fluid passageways control the fluid flow through said passageways depending on the pressure differential in said passageways.

Other objects and advantages of this invention will become apparent from the following description when taken in connection with the accompanying drawing.

BRIEF DESCRIPTION OF THE DRAWING

The present invention may be more readily described by reference to the accompanying drawing in which:

FIG. 1 is an exploded perspective view of a diaphragm controlled valve incorporating the features of this invention;

FIG. 2 is a cross-sectional view of FIG. 1 when its exploded parts are in assembled position taken along the line 2—2;

FIG. 3 is a cross-sectional view of FIG. 1 taken along the line 3—3; and

FIG. 4 is an enlarged partial view of FIG. 2 showing the diaphragm in one valve port in closing position as it will be when the pressure differential between the two parts of the of the valve housing has reached a predetermined value.

DESCRIPTION OF THE PREFERRED EMBODIMENT

Referring more particularly to the drawing by characters of reference, FIG. 1 discloses a pressure operated valve 10 comprising a housing 11 formed of two parts 12 and 12A, one a mirror image of the other, which are each provided with grooves 13, 13A in their mating juxtapositioned surfaces 14, 14A.

Parts 12 and 12A are provided with circular bores 15, 15A which are separated by a circular flexible diaphragm 16, the periphery of which is clampingly engaged in fluid tight arrangement in grooves 13, 13A when parts 12 and 12A of housing 11 are firmly held together by bolts 17, 17A extending through bolt holes 18, 18A in part 12A and into threaded engagement with holes 19, 19A in part 12.

Parts 12, 12A of housing 11 are provided with inlet ports 20, 20A and outlet ports 21, 21A as shown which provide in combination with bores 15, 15A, respectively, a pair of passageways through valve housing 11.

Nipples 22 are threaded into each of the inlet and outlet ports, as shown, for fluid tight attachment to flexible hoses (not shown).

As shown in FIG. 2, diaphragm 16 is provided with valve members 23, 23A formed on surfaces 24, 24A thereof. These valve members are suitably tapered conical members which fit into similarly tapered valve seats 24, 24A of outlet ports 21 and 21A for fluid tight engagement therewith.

As shown in FIG. 4, diaphragm 16 deflects under uneven pressure in bores 15, 15A to close or partially close one or the other of ports 21, 21A by valve members 23, 23A seating in valve seats 24, 24A. In FIG. 4, valve member 23 is seated in valve seat 24 to close outlet port 21.

Diaphragm 16 may be formed of any suitable flexible material such as rubber, plastic or the like and of any suitable thickness necessary to provide the reciprocating flexing action necessary for a valve of this type.

OPERATION

When the disclosed pressure operated valve is connected to two different sources of fluid under pressure, such as for example, oxygen and a second gas which may be hydrogen, it will monitor the gases flowing individually through the valve. If the pressure differential between the two isolated portions of the valve, namely that flowing through inlet and outlet ports 20, 21 and 20A, 21A, reaches a predetermined value, the pressure in that part of the valve with the highest value will deflect the diaphragm toward the outlet port in the other part of the valve to close or partially close it, as shown in FIG. 4, and vice versa.

Thus, if the disclosed valve was connected to an oxygen generator and the pressure in the oxygen line dropped below a given value while the pressure of the bi-product in the second line stayed the same or increased, the valve member on the diaphragm would close or partially close the outlet port on the oxygen line or low pressure side of the valve. This valve would remain closed or partially closed until such time as the pressures in both parts of the valve neutralized each other and little or no difference in pressure existed therebetween. A reverse situation would occur if the oxygen line became plugged or constricted during operation of the generator.

Although but one embodiment of the present invention has been illustrated and described, it will be apparent to those skilled in the art that various changes and modifications may be made therein without departing from the spirit of the invention or from the scope of the appended claims.

What is claimed is:

1. A pressure operated valve comprising in combination:

a valve body comprising two substantially equal size mating parts of rectangular cross-sectional configuration having juxtapositioned planar mating surfaces, each of said parts defining a cylindrical bore in its mating surface with a groove formed in its mating surface around the periphery of said bore, a flexible diaphragm of circular configuration having circular flanges formed on each side thereof along its periphery for mounting in the grooves of said mating surfaces and isolating in fluid tight arrangement the bore in one part from the bore in the other part of said body, inlet and outlet ports in each of said parts providing with the bore in that part a fluid passageway through said valve, a conically shaped valve seat in each outlet port, a pair of conical valve members each mounted on a different face of the diaphragm and integral with and of the same material as said diaphragm, each of said conical valve members cooperatively engaging with the valve seat in the outlet port in one of said parts for closing that port when the pressure in its associated passageway drops to a given value below the pressure in the other passageway, whereby said diaphragm is supported between said parts only by said flanges in said grooves of said mating surfaces and coaxially aligns said valve members with said valve seats, and means for connecting each inlet port of each of said parts to a different isolated source of fluid under pressure.

2. The pressure operated valve set forth in claim 1 wherein:

said means connects one inlet port in one of said parts to a source of oxygen under pressure and the other inlet port in the other of said parts to a source of hydrogen under pressure.

3. The pressure operated valve set forth in claim 2 wherein:

said means comprises a pair of nipples one connected to each of said inlet ports.

* * * * *